(12) United States Patent
Barg et al.

(10) Patent No.: US 6,701,278 B1
(45) Date of Patent: Mar. 2, 2004

(54) DEVICE AND METHOD FOR PRODUCING A DEFINED VALUE FOR THE CONTROL OF A DRIVE

(75) Inventors: Juergen Barg, Michelstadt (DE); Joerg Deisenroth, Kuenzell-Keulos (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/049,708
(22) PCT Filed: Aug. 12, 2000
(86) PCT No.: PCT/DE00/02731
§ 371 (c)(1),
(2), (4) Date: Jul. 22, 2002
(87) PCT Pub. No.: WO01/13188
PCT Pub. Date: Feb. 22, 2001

(30) Foreign Application Priority Data

Aug. 18, 1999 (DE) .......................................... 199 39 137

(51) Int. Cl.[7] ......................... G01C 17/00; G01C 19/60; G01C 9/00; G06F 15/00
(52) U.S. Cl. ......................... 702/152; 700/28; 700/118; 700/119; 700/159; 700/182; 700/195; 700/255; 700/262
(58) Field of Search ............................ 702/152; 700/28, 700/118, 119, 159, 182, 195, 255, 262

(56) References Cited

U.S. PATENT DOCUMENTS 6,308,108 B1 * 10/2001 Michiwaki et al. ......... 700/195
6,401,001 B1 * 6/2002 Jang et al. .................. 700/118
6,401,002 B1 * 6/2002 Jang et al. .................. 700/119
6,405,095 B1 * 6/2002 Jang et al. .................. 700/118
6,445,971 B1 * 9/2002 Gottschalk et al. ......... 700/159
6,493,607 B1 * 12/2002 Bourne et al. .............. 700/255
6,501,997 B1 * 12/2002 Kakino ........................ 700/28
6,535,794 B1 * 3/2003 Raab .......................... 700/262
2002/0095236 A1 * 7/2002 Dundorf ..................... 700/182

* cited by examiner

Primary Examiner—John Barlow
Assistant Examiner—Aditya Bhat
(74) Attorney, Agent, or Firm—Michael J. Striker

(57) ABSTRACT

An apparatus and a method for generating a set-point value for triggering at least one drive mechanism, in particular for a machine tool, are proposed, wherein, in a parts program (20) for describing a path of motion of a tool (12) movable by the at least one drive mechanism (18), at least two parts program positions (X1, Y1, Z1; X2, Y2, Z2; X3, Y3, Z3) are stored in memory. A controller (18) which from the parts program (20) ascertains at least one drive mechanism set-point value (VA(S)) for triggering the drive mechanism (18). Means (18) are provided for ascertaining a distance (S) that is located between the at least two parts program positions (X1, Y1, Z1; X3, Y3, Z3) and for generating a drive mechanism set-point value (VA(S)) as a function of the distance (S) and of at least one parts program parameter (V1, V2).

7 Claims, 2 Drawing Sheets

DEVICE AND METHOD FOR PRODUCING A DEFINED VALUE FOR THE CONTROL OF A DRIVE

BACKGROUND OF THE INVENTION

The invention is based on an apparatus and a method for generating a set-point value for triggering at least one drive mechanism, in particular for machine tools. In conventional machine tool controllers, movement specifications can be stored in memory inside a so-called parts program in the form of a succession of support points. In order to take certain technical conditions into account, dynamic conditions are stored in memory in, the parts program in the form of feed values. Particularly in the case of a path of motion whose feed values fluctuate severely, ramp-like speed courses can become established, since as a rule, the controller imposes a train of set-point values on the drive mechanism in order to reach the next programmed feed value with maximum acceleration. The discontinuous speed courses that result under some circumstances make high demands on the machine mechanics. These have an adverse effect on the machining quality.

SUMMARY OF THE INVENTION

The object of the invention is to specify suitable set-point values to the drive mechanism of a machine tool so as to achieve a uniform course of speed and/or acceleration. This object is attained with the characteristics of the bodies of the independent claims.

ADVANTAGES OF THE INVENTION

The apparatus and method according to the invention for generating a set-point value for triggering at least one drive mechanism, in particular for a machine tool, includes a parts program or a comparable arrangement for describing a path of motion of a tool that is movable by the drive mechanism. The parts program includes at least two parts program positions with an associated parts program parameter, such as the feed. From the parts program, the controller ascertains a train of set-point values for triggering the drive mechanism. Means are provided for ascertaining a distance that is located between the at least two parts program positions and for generating the train of set-point values as a function of the distance and of the parts program parameter.

Including the distance to be traversed between two position values permits a uniform, continuous specification of the drive mechanism set-point value. By ascertaining the distance still to be traveled, the total (future) path of motion sequence is incorporated into the set-point value specification. As a result, fast, continuous machining of workpieces can be achieved. Gentle speed or acceleration transitions can be attained even when the motion sequences are fluctuating severely. In addition, the apparatus according to the invention enables simple programming of a parts program when the speed specifications are varying sharply. Only two position values have to be programmed with the associated motion values (speed or acceleration). On its own, the controller ascertains the distance located between the two position valves and from that derives a continuous course of the drive mechanism set-point values as a function of the change in the two parts program parameters stored in memory. A path of motion with feed values that vary monotonously need not be specified on the basis of individual NC sets; merely programming the starting and ending feed values as parts program parameters suffices.

In an expedient refinement, the at least two parts program positions, to which respective beginning and ending parts program motion values are assigned, are identified in a certain way in order to cause the controller to ascertain the distance between precisely these two parts program positions. The user can easily alternate between the conventional specification of a drive mechanism set-point value or that according to the invention, depending on the kind of machining desired.

Another advantageous feature provides that the drive mechanism set-point values be interpolated linearly between the parts program parameters with regard to the speed.

Further expedient refinements will become apparent from other dependent claims and from the description.

DRAWING

One exemplary embodiment is shown in the drawing and explained in further detail in the ensuing description.

FIG. 1 is a block circuit diagram;

FIGS. 2, 3a, 3b, and 5 show typical set-point value courses;

DESCRIPTION OF THE EXEMPLARY EMBODIMENT

Figure 1:
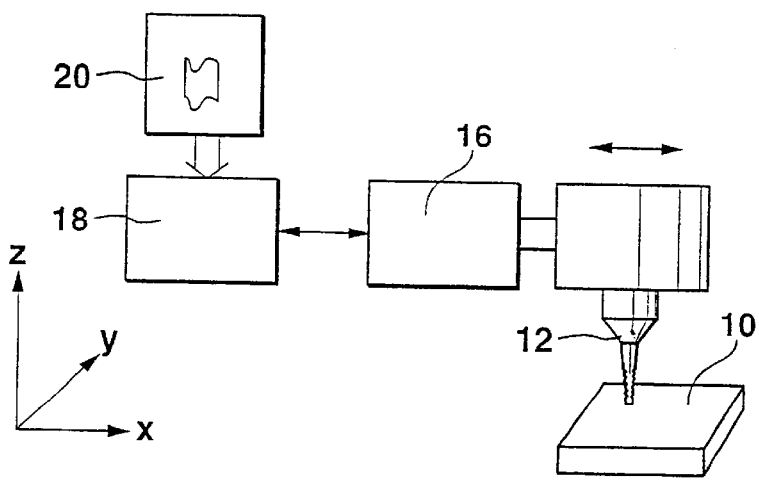
Figure 2:
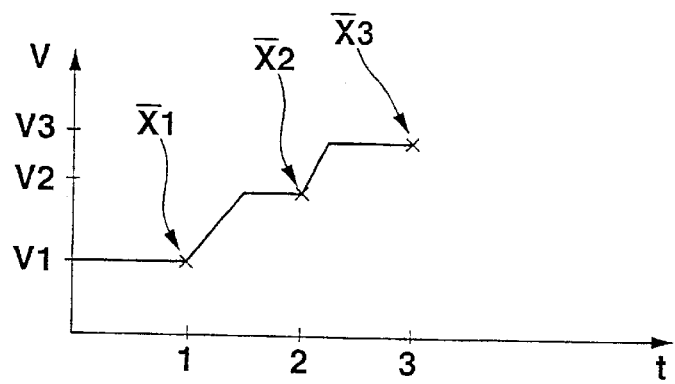

A workpiece 10 is machined by a tool 12, which is driven at least in the x direction by a drive mechanism 16. The drive mechanism 16 receives set-point values from a controller 18, which processes data of a parts program 20 accordingly. FIG. 2 shows a typical ramplike feed course V of the prior art.

Figure 3A:
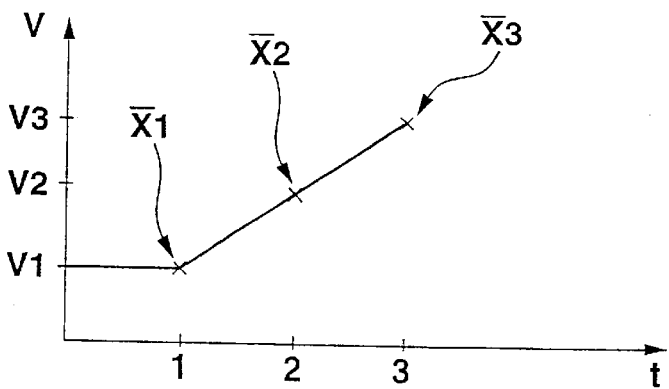
Figure 3B:
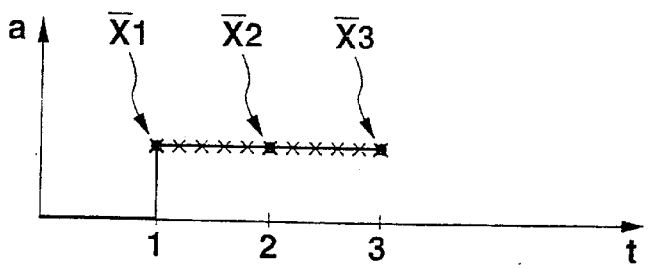
Figure 4:
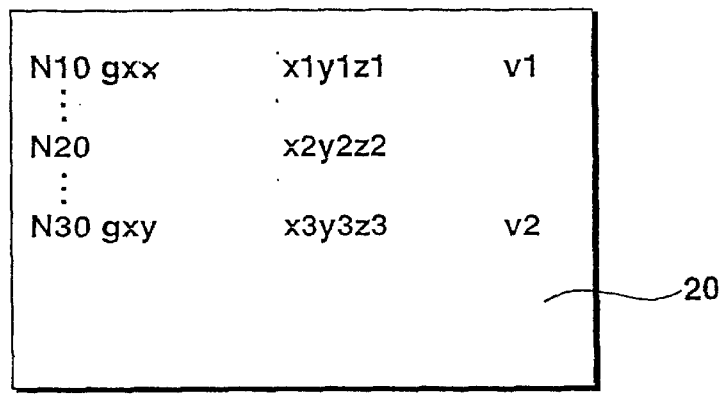
FIG. 4 shows a parts program.
Figure 5:
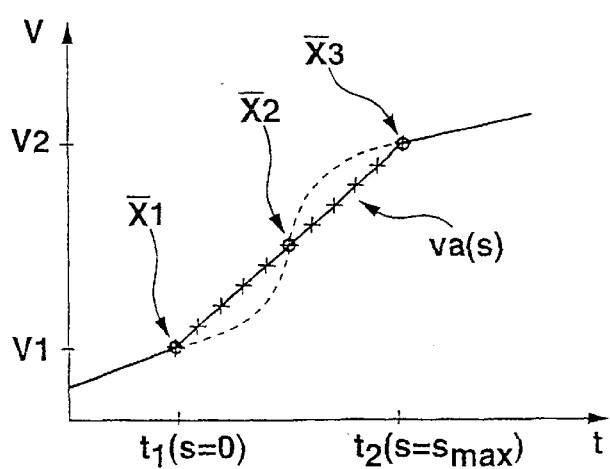
Figure 6:
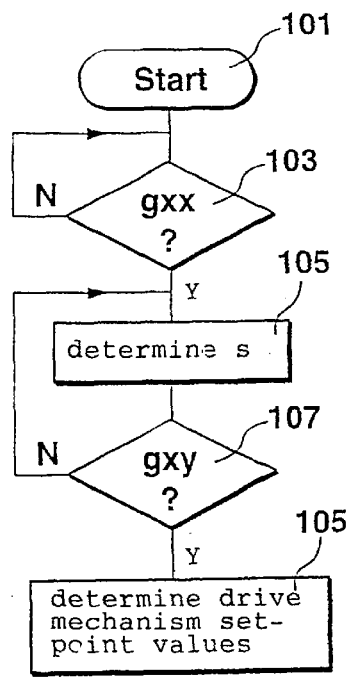
FIG. 6 is flowchart for the apparatus and the method according to the invention.

FIGS. 3a, 3b show a course of feed or acceleration of the kind that results in the apparatus and method of the invention. In the parts program 20 in FIG. 4, three NC data sets are shown as examples. A start command designated Gxx tells the controller 18 that the set-point value specification according to the invention should be used to begin with. In this first NC set, first parts program positions X1, Y1, Z1 are also stored in memory along with an associated first parts program parameter V1. As the parts program parameter, in the exemplary embodiment, the programmed feed V1 is used, hereinafter called the parts program feed. In the second data set, a second parts program position X2, Y2, Z2, which is to be approached, is indicated. The third NC data set is preceded by an end command Gxy, along with a third parts program position X3, Y3, Z3 with a second parts program parameter V2, hereinafter called the second parts program feed V2. The associated motion diagram is shown in FIG. 5. The plus signs located on the straight line represent the distance-dependent drive mechanism set-point values VA(S) ascertained by the controller 18. These are speed or acceleration values, ascertained according to the invention, which can optionally be made available to the drive mechanism 16 as position set-point values by integration.

In a conventional drive mechanism set-point value specification, a feed course as shown in FIG. 2 results. Conventionally, each parts program position X1, X2, X3 in the parts program 20 is assigned the respective parts program feed V1, V2, V3. In the first parts program position, the conventional controller specifies a maximum acceleration as a set-point value to the drive mechanism 16 for reaching the programmed parts program feed V2 no later than by the second parts program position X2. This second parts program feed V2 is as a rule already reached markedly before the second parts program position X2, resulting in the ramplike course shown, which leads to the speed course shown.

In the apparatus and the method according to the invention, conversely, continuous motion courses are achieved in a targeted way, as shown in FIGS. 3a, 3b. How this course of motion comes about will be explained in terms of the exemplary embodiment in conjunction with FIGS. 4 and 5. The beginning of a portion in a parts program 20 that is distinguished by severely fluctuating feed courses is marked by the start command Gxx. The first parts program position X1, Y1, Z1 is reached with the first parts program feed V1. If no first parts program feed V1 has been programmed in the data set, then the controller 18 makes use of the most recent parts program feed in the NC program. By means of the start command Gxx, the set-point value specification according to the invention is initiated. If the controller 18 recognizes the start command Gxx, which is step 103, then by integration it ascertains the distance S which is traversed, beginning at the first parts program position X1 marked by the start command Gxx, through the further parts program position X2, to the third parts program position X3 marked by the end command Gxy. The controller 18 first calculates the distance S to the second parts program position X2, which can be immediately followed by still other intermediate positions. The distance S to the next intermediate position X to be approached is determined, which is step 105, until such time as the end command Gxy is recognized, which is step 107. The resultant length of the distance at the third parts program position X3 identified by the end command Gxy is stored in memory as the maximum distance Smax for the further determination of the drive mechanism set-point values VA; this is step 109. The second parts program feed V2 to be reached is stored in memory in this third NC set. The controller 18 recognizes that increasing the feed from V1 to V2 can be reached within the ascertained distance Smax.

The specification of the drive mechanism set-point values VA(S), which in the exemplary embodiment is the set-point speed of the drive mechanism, is accomplished as a function of the distance S. In FIG. 5, a linear increase in the feed is contemplated. The drive mechanism set-point values can be described by a known linear equation taking the following form:

$$VA(S)=(V2-V1)*(S:Smax)+V1.$$

With this equation, the result can for instance be the drive mechanism set-point value course VA marked by plus signs in FIG. 5, if the drive mechanism set-point values VA(S) are specified discretely with the same distance spacing ΔS. The drive mechanism set-point values VA are thus distinguished by a uniform course, resulting in a path of motion as shown in FIGS. 3a, 3b.

In terms of usage, numerous modifications are conceivable. Instead of a linear speed transition as described above, the drive mechanism set-point values VA could in principle be described by arbitrary mathematical functions. A function shown in dot-dashed lines in FIG. 5 assures a smooth transition between the two feed values V1, V2, without any kinks in the course of acceleration.

The calculation according to the invention of the drive mechanism set-point value specification could also be employed if instead of the feed values V1, V2, corresponding speed changes have to be traversed without jerking.

What is claimed is:

1. An apparatus for generating a set-point value for triggering at least one drive mechanism (16) for a tool (12), said apparatus comprising a parts program (20) comprising means for determining a path of motion of the tool (12); and a controller (18) for controlling said at least one driver mechanism (16) of said tool;

wherein at least two parts program positions (X1, Y1, Z1; X2, Y2, Z2; X3, Y3, Z3) stored in memory, at least one (X1, Y1, Z1) of said at least two parts program positions is identified with a start command (Gxx) and at least one other (X3, Y3, Z3) of said at least two parts program positions is identified with an end command (Gxy); and wherein said controller (18) includes means for ascertaining a distance (S) between said at least one parts program position and said least one other parts program position (X1, Y1, Z1; X3, Y3, Z3) identified by the start command (Gxx) and the end command (Gxy) respectively, and means for generating a drive mechanism set-point value (VA(S)) as a function of said distance (S) and of at least one parts program parameter (V1, V2).

2. The apparatus as defined in claim 1, wherein said drive mechanism set-point value (VA(S)) varies linearly with time.

3. The apparatus as defined in claim 1 or 2, wherein said drive mechanism set-point value (VA(S)) is a speed or acceleration value.

4. The apparatus as defined in claim 1, further comprising integrating said drive mechanism set-point value (VA(S)) to obtain an integrated value and feeding said integrated value to said at least one drive mechanism as a set-point variable.

5. The apparatus as defined in claim 1, wherein said at least one parts program parameter (V1, V2) is a programmed feed.

6. The apparatus as defined in claim 1, further comprising a machine tool including said at least one drive mechanism (16) and said tool (12) driven by said at least one drive mechanism (16).

7. A method for generating a set-point value for triggering at least one drive mechanism (16) for a tool (12) by means of a controller (18), said method comprising the steps of:

a) providing a parts program for determining a path of motion of the tool (12);

b) storing at least two parts program positions (X1, Y1, Z1; X2, Y2, Z2; X3, Y3, Z3) in memory;

c) ascertaining by means of the controller (18) a distance (S) between one of said parts program positions and another of said parts program positions identified by a start command (Gxx) and an end command (Gxy) respectively; and d) generating a drive mechanism set-point value (VA(S)) as a function of said distance (S) and of at least one parts program parameter (V1, V2) by means of the controller (18).

* * * * *